July 24, 1956 R. M. HELLER 2,755,507
APPARATUS FOR APPLYING PLASTIC COATINGS TO ARTICLES
Filed June 14, 1951 11 Sheets-Sheet 2
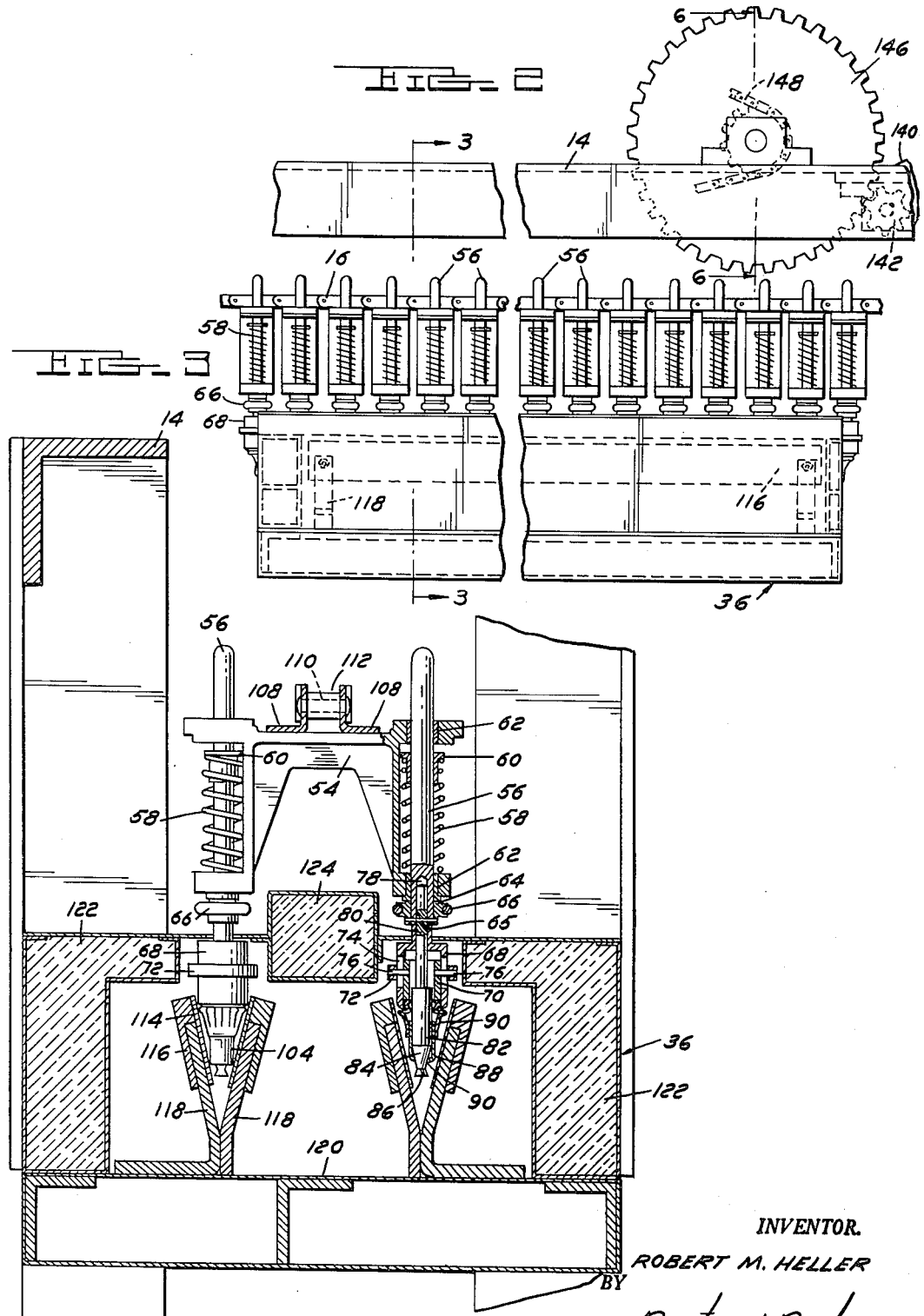
INVENTOR.
ROBERT M. HELLER
BY
Burton & Parker.
ATTORNEYS

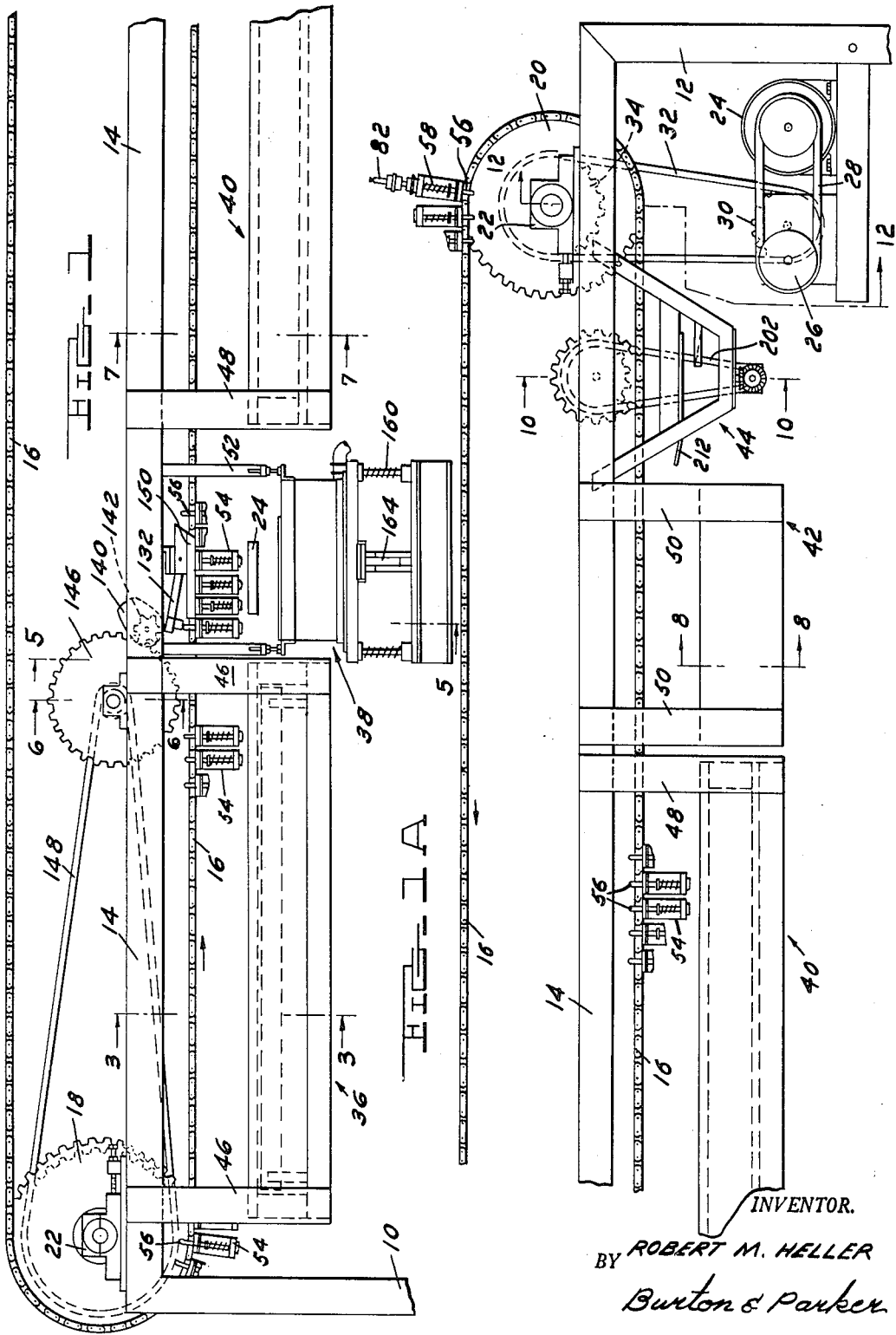

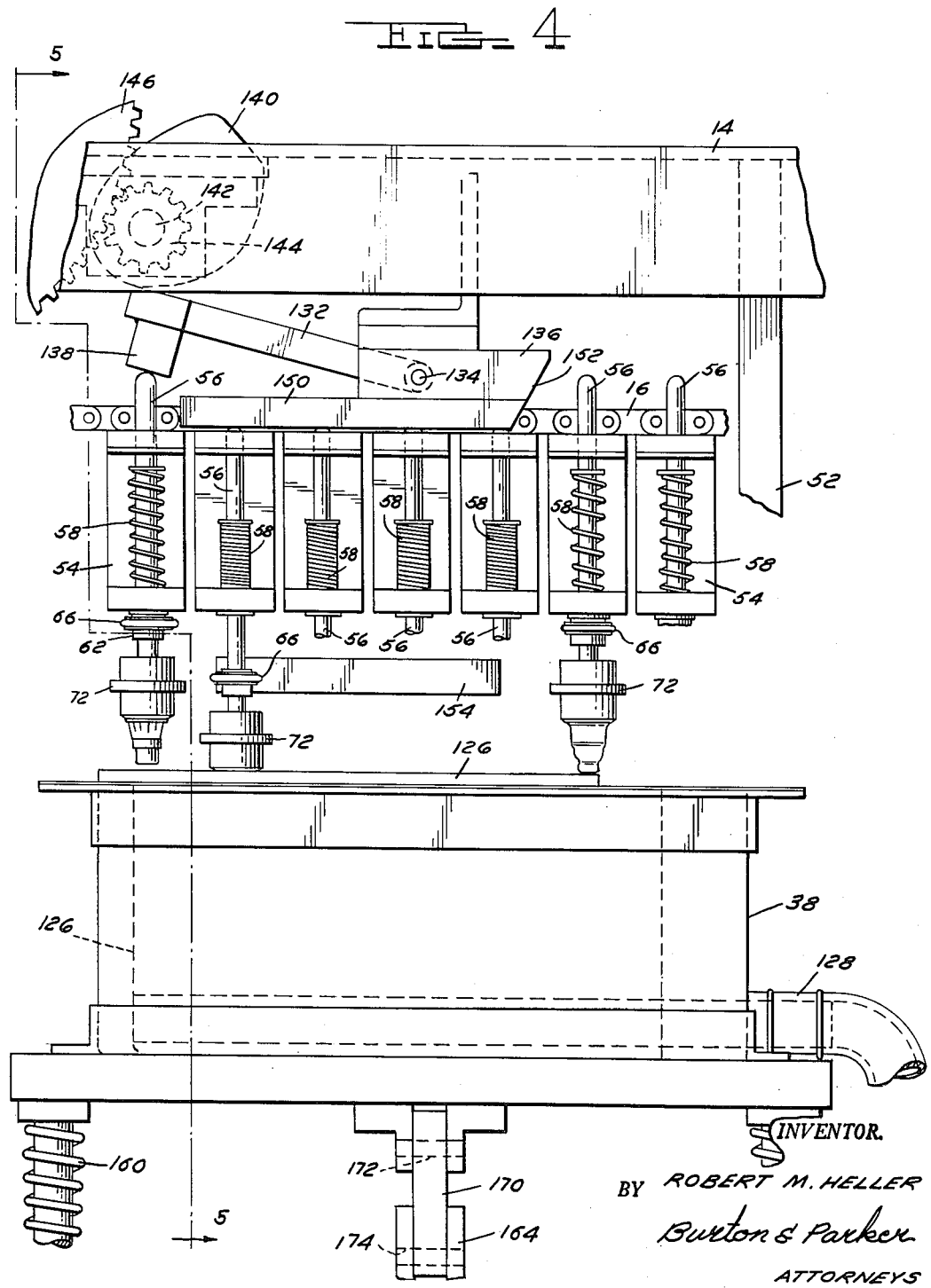

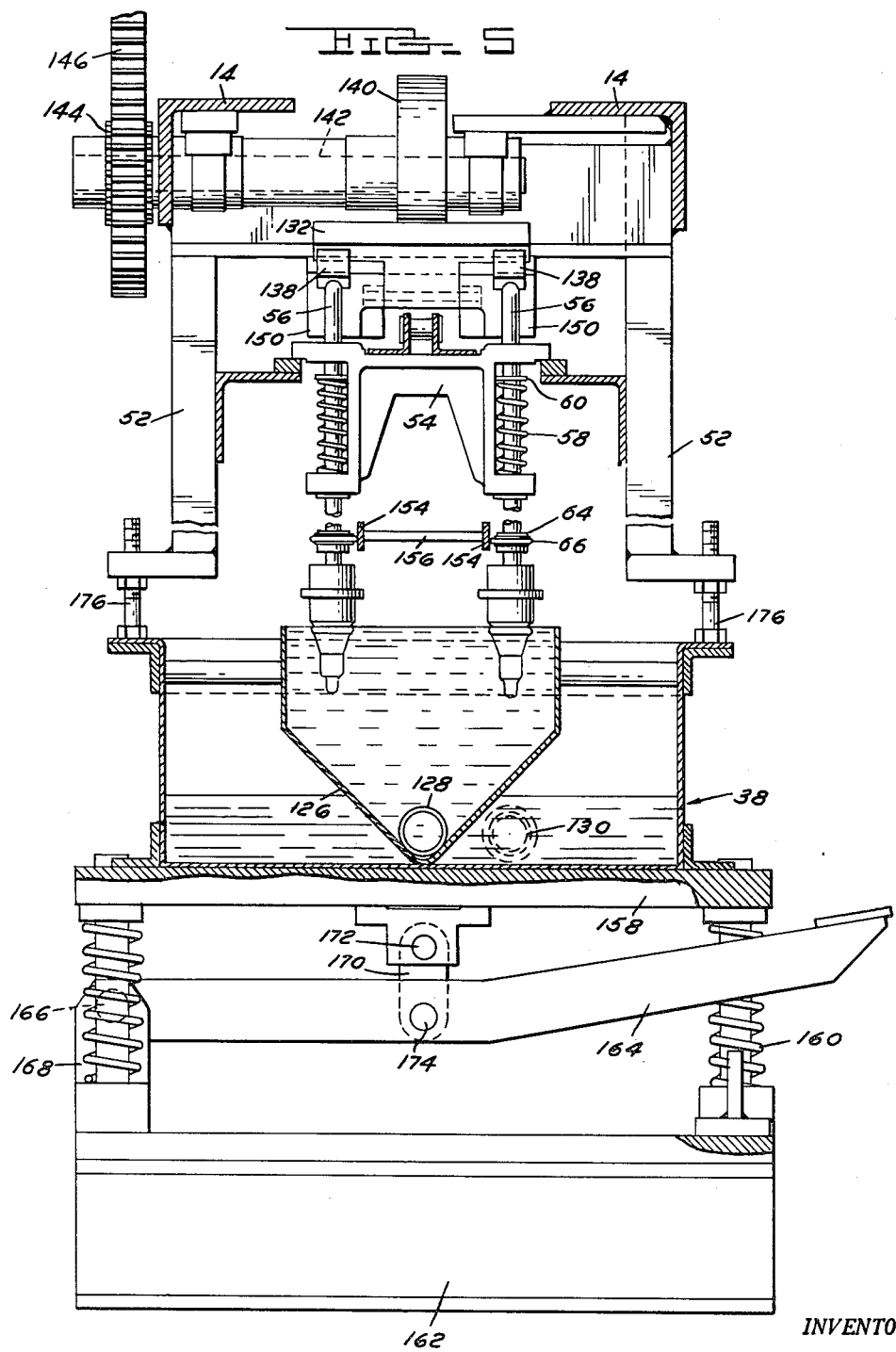

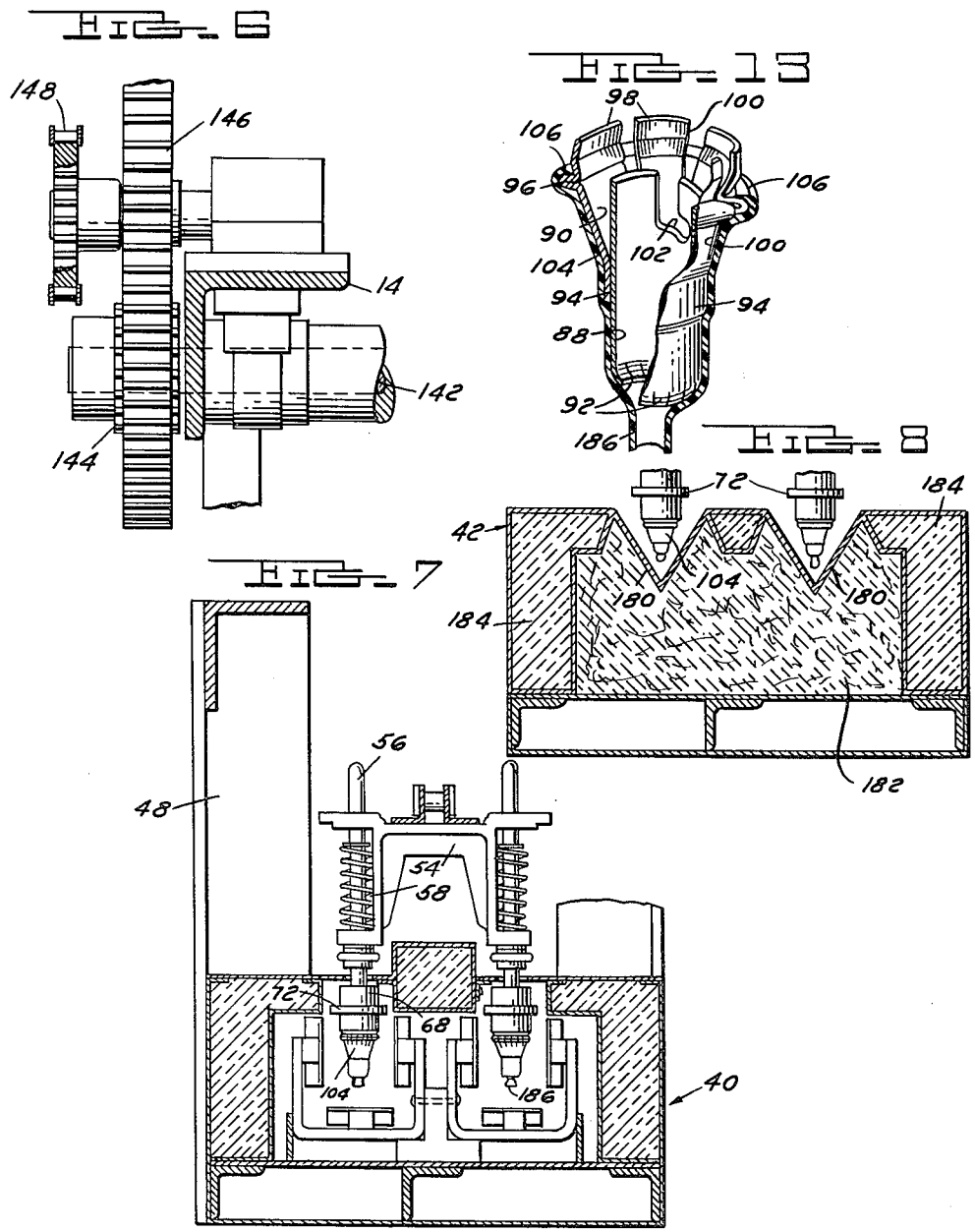

July 24, 1956  R. M. HELLER  2,755,507
APPARATUS FOR APPLYING PLASTIC COATINGS TO ARTICLES
Filed June 14, 1951  11 Sheets-Sheet 6
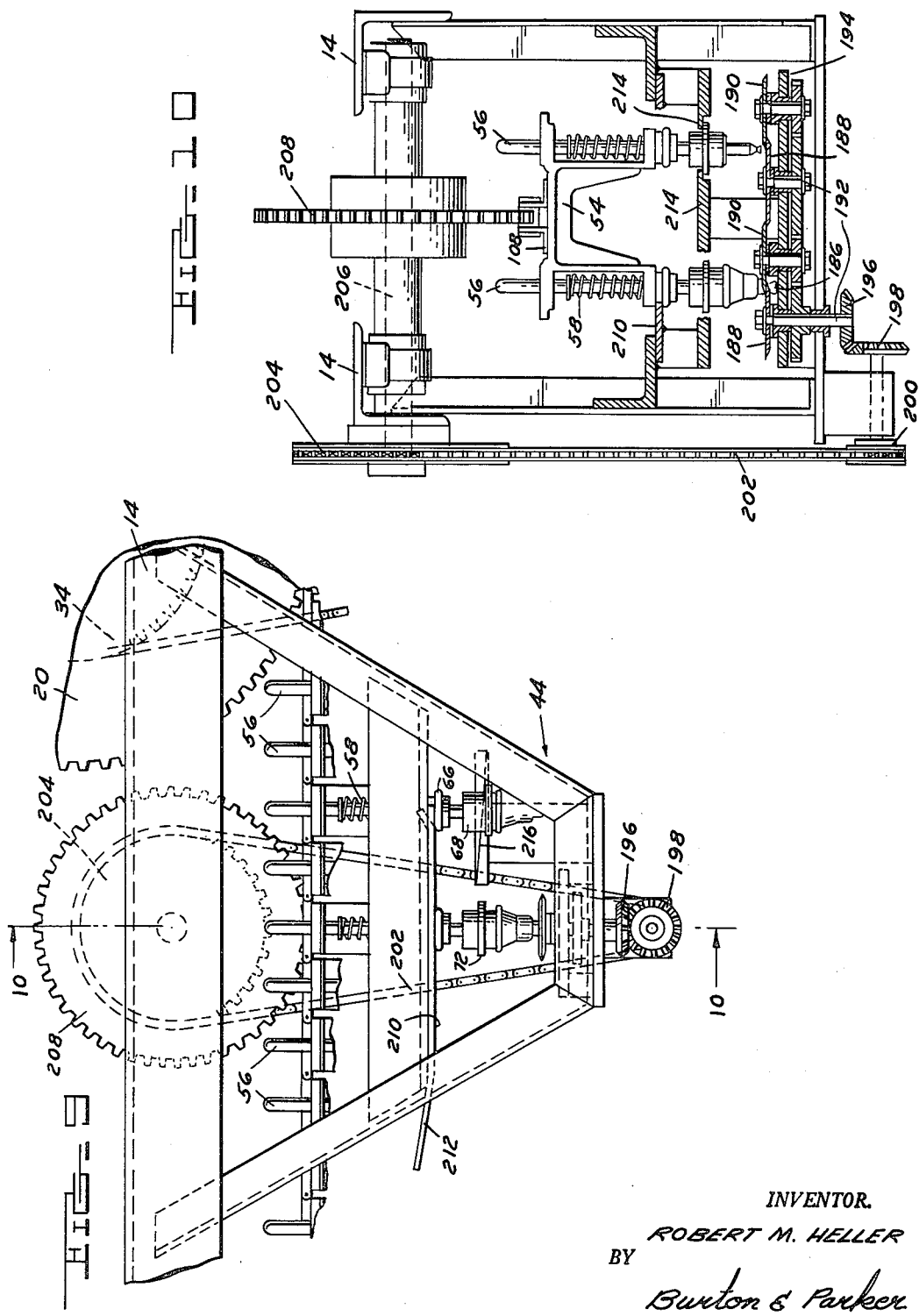
INVENTOR.
ROBERT M. HELLER
BY
Burton & Parker
ATTORNEYS

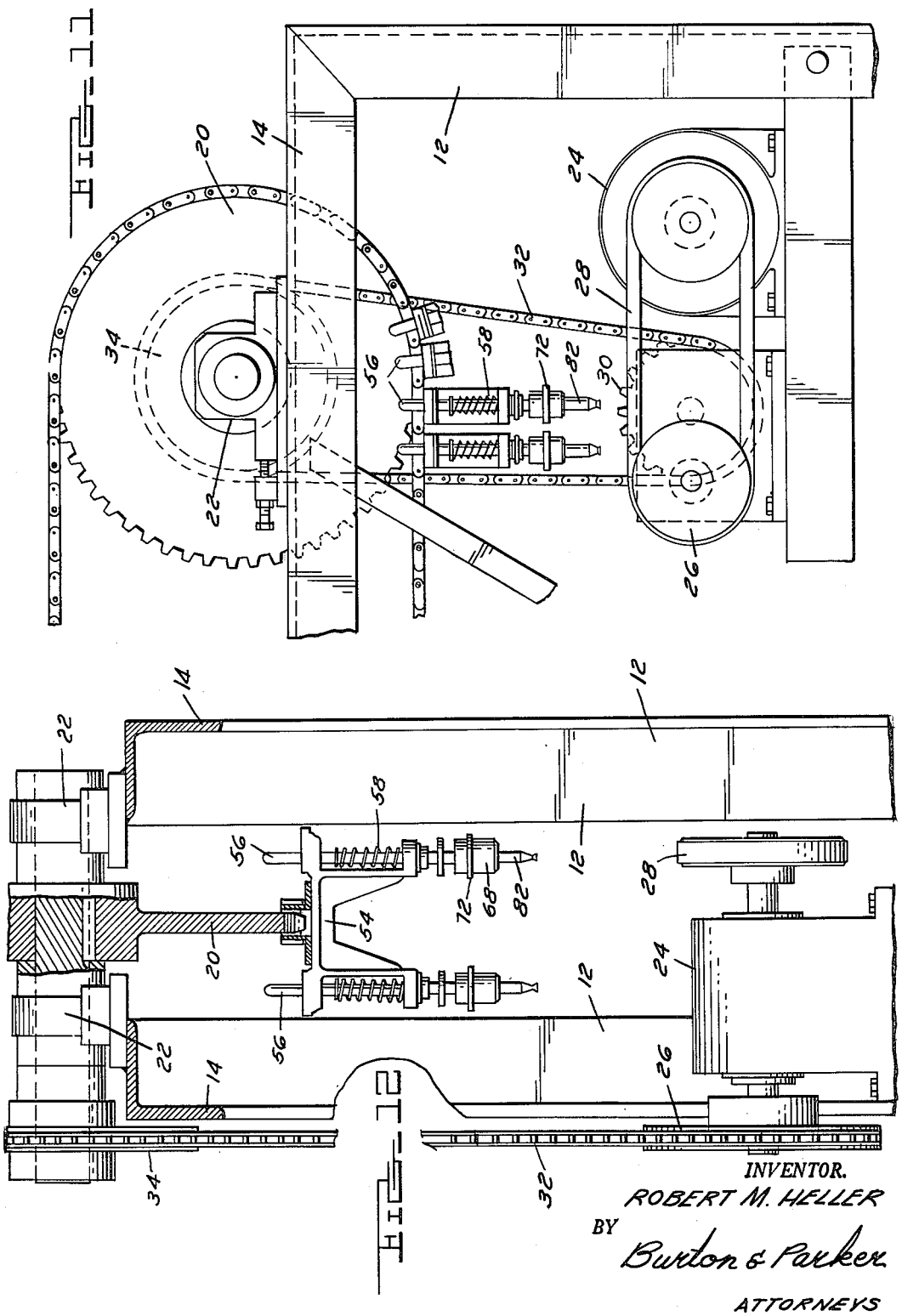

July 24, 1956 R. M. HELLER 2,755,507
APPARATUS FOR APPLYING PLASTIC COATINGS TO ARTICLES
Filed June 14, 1951 11 Sheets-Sheet 8
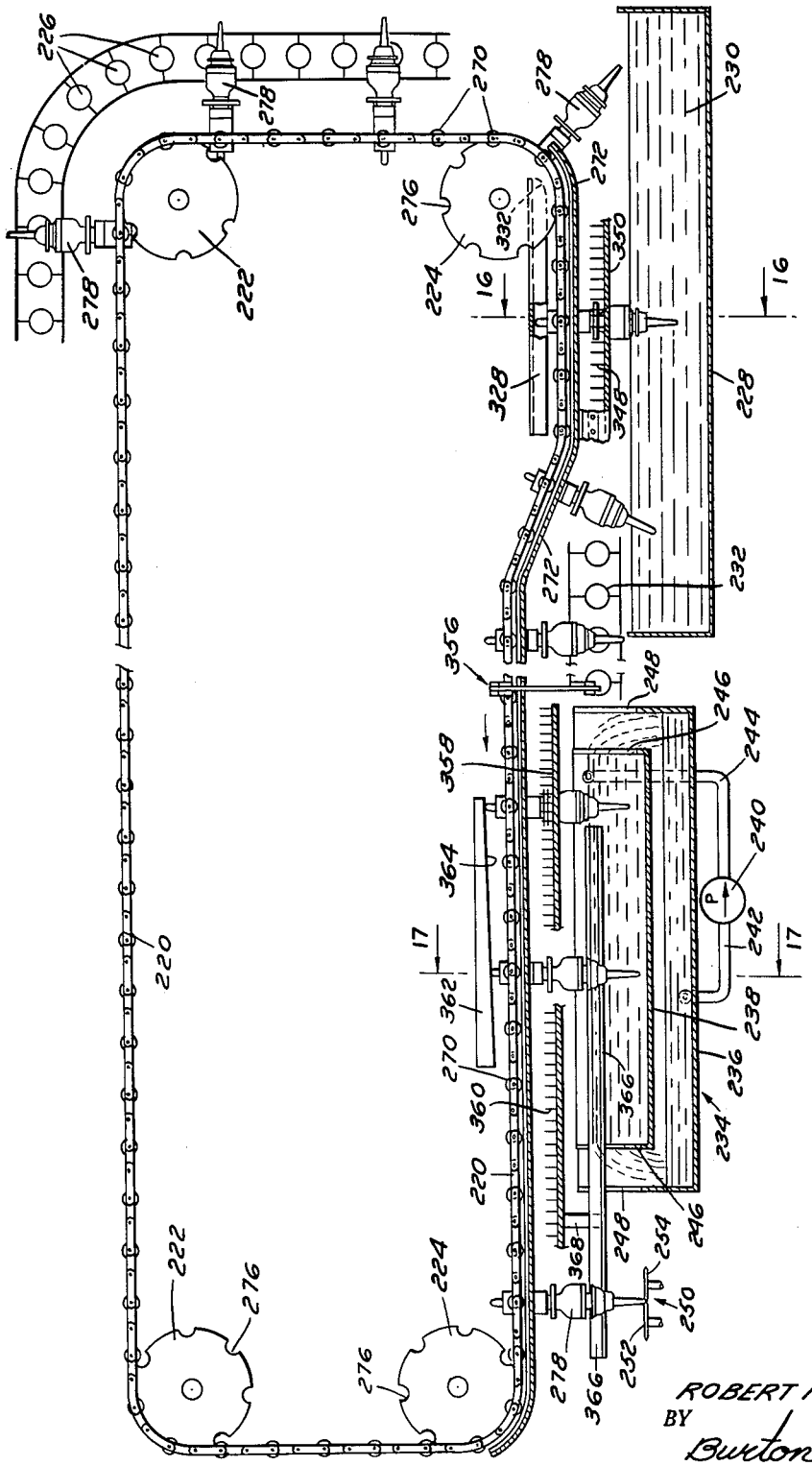
INVENTOR.
ROBERT M. HELLER
BY
Burton & Parker
ATTORNEYS

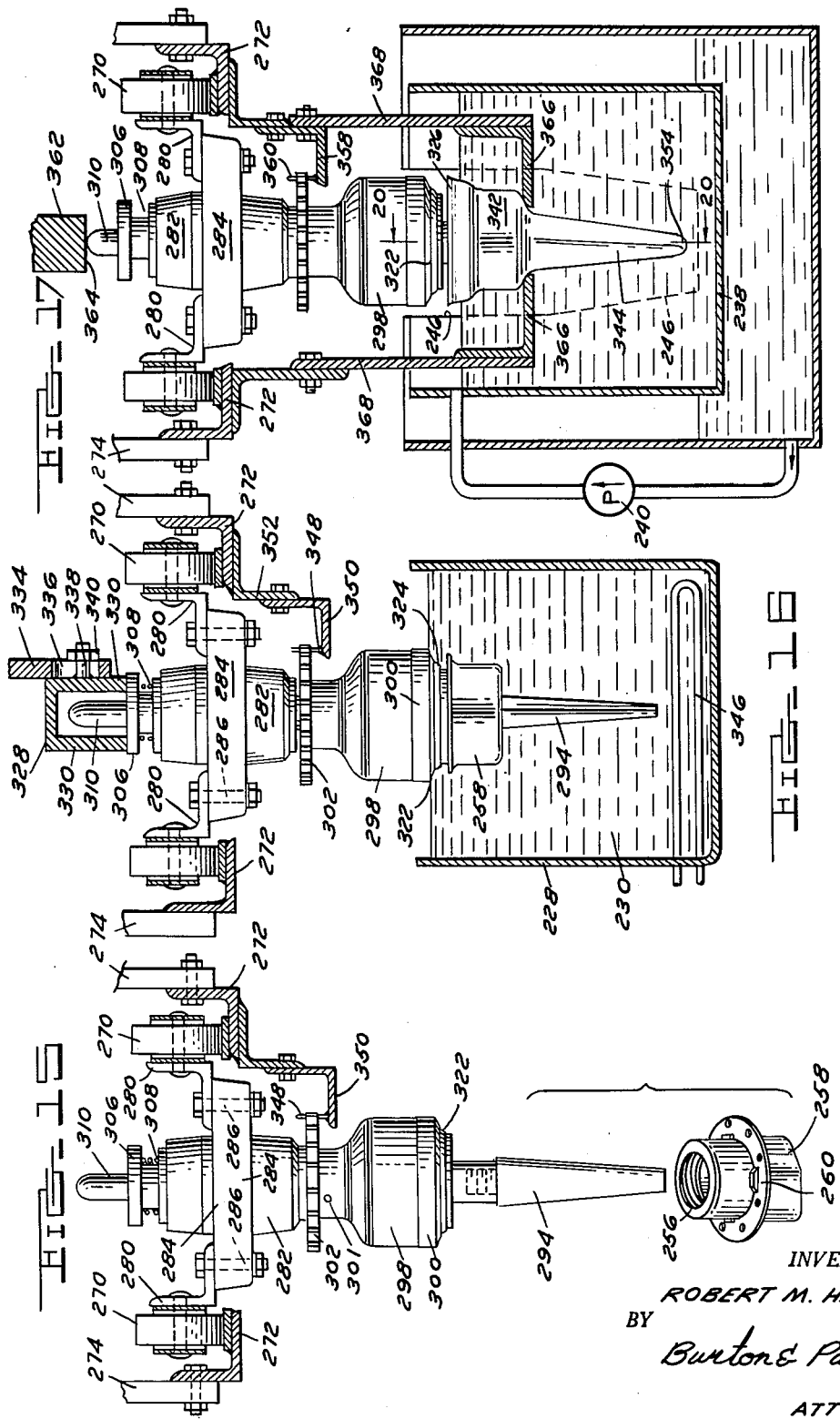

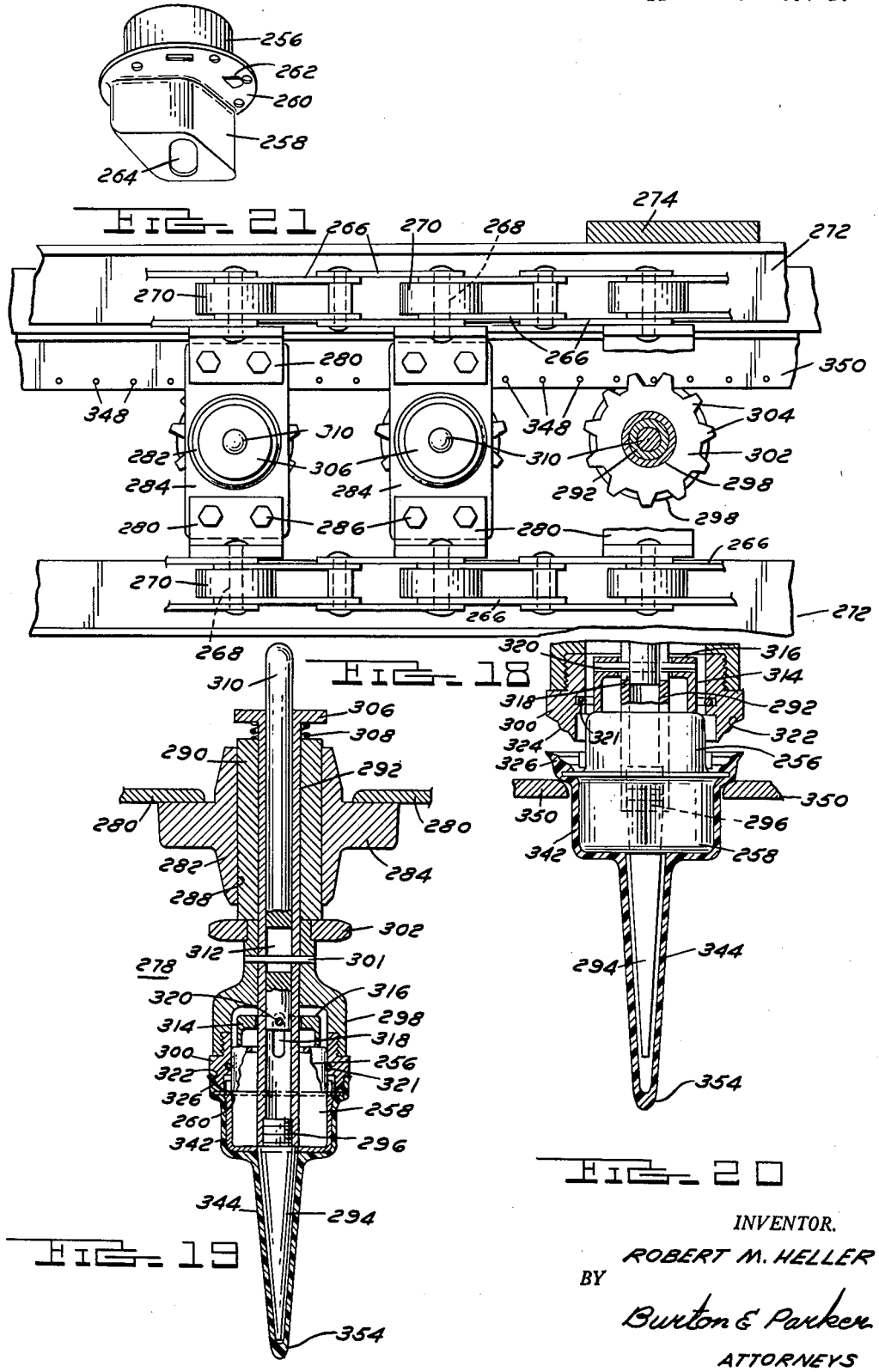

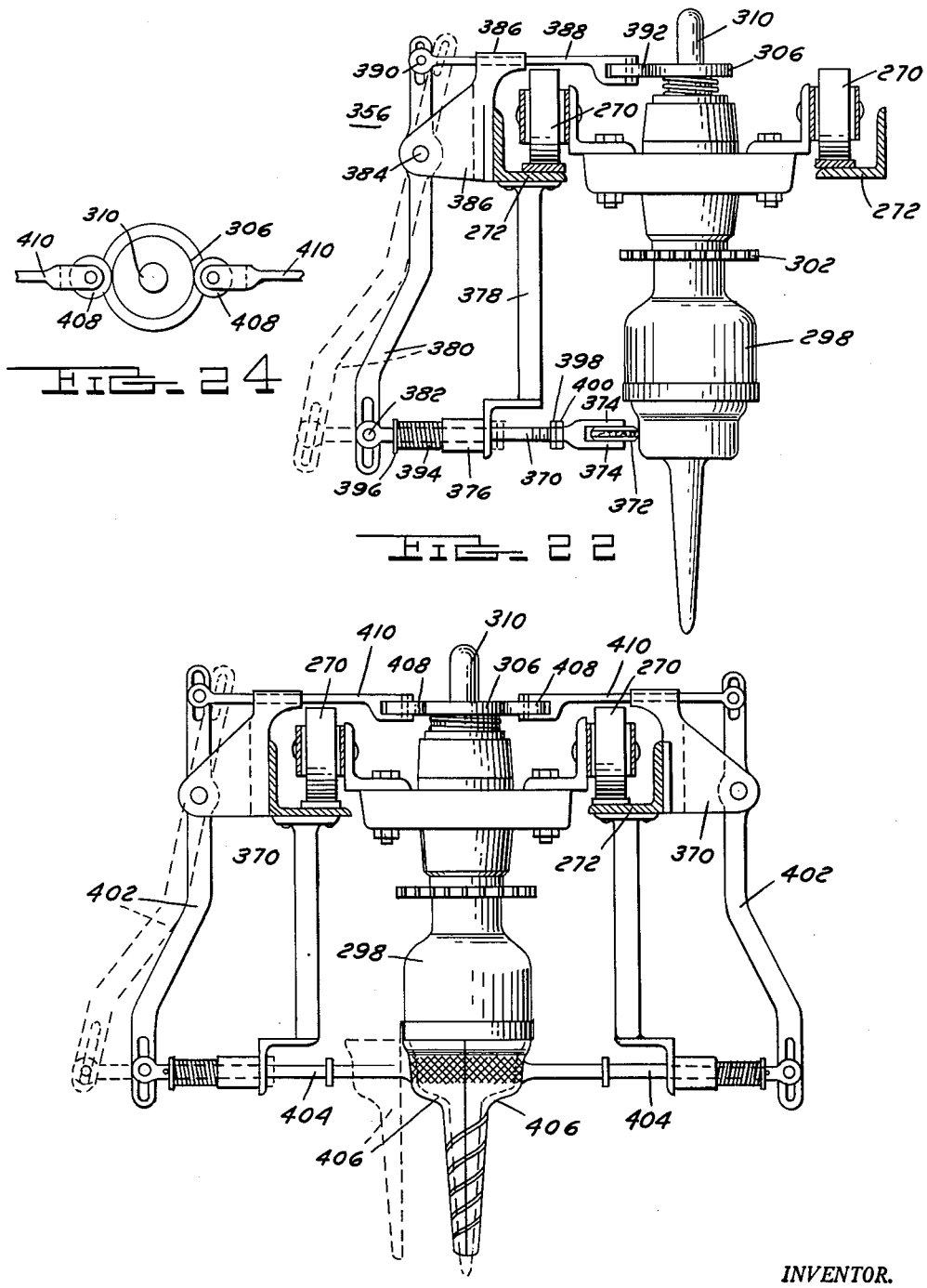

United States Patent Office 2,755,507
Patented July 24, 1956

2,755,507

APPARATUS FOR APPLYING PLASTIC COATINGS TO ARTICLES

Robert M. Heller, Birmingham, Mich.

Application June 14, 1951, Serial No. 231,606

4 Claims. (Cl. 18—24)

This invention relates to an apparatus for applying plastic coatings to articles and particularly to such an apparatus which precisely applies the plastic over a designated part or parts of an article and in such a way that the resulting plastic coating becomes an integral and functional component of the article.

There are many articles in the form of single pieces and unitary assemblies which are mounted in supporting members so that a part of the article is concealed within the supporting member and the balance thereof is exposed and liable to rust, corrosion, abrasion and otherwise due to moisture, dust and other foreign elements. Such articles are, for example, electric light bulb sockets installed on instrument panels and tail light assemblies of motor vehicles and also such replaceable articles are spark plugs of internal combustion engines. Other examples are selected portions of high tension ignition systems, battery cables, hydraulic brake hose and other forms of connectors employed in wiring circuits. The present invention has to do with the application of protective coatings to the exposed or exterior parts of such articles and any elements associated therewith, and particularly to the application of such coatings such that they constitute a functional part of the product in addition to serving as a protective coating therefor. The invention precisely limits or terminates the application of the plastic coating so that the article may be readily installed in a supporting member or secured to a supplemental part and employ the coating as an insulating and protective seal at the connecting joint between the article and the supporting member or supplemental part. The invention may be used to apply the plastic coating in such a manner that the plastic material forms a useful extension to the article.

An important object of the present invention is to provide an improved apparatus for applying a protective plastic coating to such articles and to any extensions or additions thereto which is performed in a continuous manner and equally distributes the protective coating to that part of the article and any extension or addition thereof which in its final installed position will be exposed. Another important object of the invention is to provide an improved apparatus for applying a protective coating of plastic material to the exposed portions of such articles assembled to specially designed arbors or mandrels which terminates the coating at such a precise point or level on the article that it serves as a seal around the opening into which the article is inserted. A further important object of the invention is to provide a plastic coating apparatus which operates in a continuous, rapid manner and applies the coating in such a way that the products are uniformly and accurately coated and such that the plastic material applied becomes an integral and functional part of the article.

In carrying out the objects of the invention, the articles to be plastic coated are first attached to an arbor or mandrel which is so designed that the resultant coating of the assembly of the article and the arbor enables the article to perform functions incapable of being obtained in its original or uncoated state. The assemblies so described are then moved along a prescribed path and subjected to certain treatments as they are advanced for receiving the plastic material on that portion thereof which in use will be in relatively exposed condition. In the early portion of its movement along the path, each assembly including the article to be coated is subjected to a heat treatment rendering it readily acceptable for receiving the plastic material. Thereafter, a flowable plastic material is applied to the assembly and while it is moving in a heated condition. After the coating of plastic has been applied, the assembly including the article is subjected to a temperature treatment to attain the desired adherence of the plastic material and the setting or curing thereof. When the setting or cure of the plastic coating is complete as result of being exposed to sufficient heat, the assembly moves into a chilling zone or bath which absorbs the latent heat sufficiently to prevent overcuring and to render the finished article cool enough to handle. Finally, as the article is moved along the path, excess plastic material may be removed from the assembly and the finished coated article is then ejected from the arbor and the machine. An important feature of the invention is the provision for rotating the assembly at the time the plastic material is applied thereto so that the resultant coating material is evenly distributed over exterior surface portions of the assembly. Another important feature of the invention is the provision of a dip tank containing the plastic material in flowable condition and the provision of means for successively immersing each assembly in the plastic solution to a precise level and rotating the assembly while so immersed.

Various other objects, advantages and meritorious features will become more fully apparent from the following specification, appended claims and accompanying drawings, wherein:

Figs. 1 and 1A are side elevations respectively of the left and right end sections of a machine embodying the invention;

Fig. 2 is an enlarged fragmentary side elevation of the preheating portion of the machine;

Fig. 3 is an enlarged vertical cross sectional view of the preheating chamber portion of the machine taken along line 3—3 of Fig. 2 and also of Fig. 1;

Fig. 4 is an enlarged fragmentary side elevation of the machine showing the intermediate assembly coating portion thereof;

Fig. 5 is a vertical cross sectional view taken along line 5—5 of Fig. 4 and also of Fig. 1;

Fig. 6 is a fragmentary vertical sectional view taken along line 6—6 of Fig. 1 and showing a part of the drive mechanism for dipping the assemblies in a plastic coating solution;

Fig. 7 is an enlarged view through the final heating chamber portion of the machine and taken along line 7—7 of Fig. 1;

Fig. 8 is an enlarged vertical cross sectional view through the chilling chamber portion of the machine and taken along line 8—8 of Fig. 1A;

Fig. 9 is an enlarged fragmentary side elevation of the cutter portion of the machine for removing excess plastic material from the coated assemblies;

Fig. 10 is a vertical cross sectional view through the cutter portion of the machine taken along line 10—10 of Fig. 9 and also of Fig. 1A;

Fig. 11 is an enlarged side elevation of the rear end section of the machine;

Fig. 12 is a vertical cross section of the rear end section of the machine and taken along line 12—12 of Fig. 1A;

Fig. 13 is a perspective view, partly in section, showing a product coated by the machine;

Fig. 14 is a schematic view in side elevation of a modification of the apparatus shown in Figs. 1 and 1A;

Fig. 15 is a cross sectional view through the conveyor of the modification in Fig. 14 showing an arbor in side elevation and a light bulb socket disposed below the arbor in position to be received over the arbor;

Fig. 16 is a vertical cross section through the heating portion of the apparatus in Fig. 14 taken along line 16—16 thereof;

Fig. 17 is a vertical cross-sectional view through the plastic applying portion of the apparatus in Fig. 14 taken along line 17—17 thereof and showing an article assembly immersed in a plastic solution;

Fig. 18 is a top plane view of a section of the conveyor system of the apparatus in Fig. 14 showing the provision for rotating the arbor as it is advanced;

Fig. 19 is a longitudinal sectional view through a modified form of hanger and chuck assembly showing the position of an article thereon immediately after the plastic material has been applied;

Fig. 20 is a longitudinal sectional view of the lower portion of the hanger and chuck assembly of Fig. 19 taken 90° thereto and showing the plastic coated article in partially dislodged position on the arbor preparatory to the trim operation;

Fig. 21 is a perspective view of the light bulb socket shown in Fig. 15 but showing the opposite end thereof;

Fig. 22 is a fragmentary vertical cross sectional view of the machine taken along line 22—22 of Fig. 14 and showing a device for modifying the plastic coating on the article before it takes a permanent set;

Fig. 23 is a fragmentary cross sectional view similar to Fig. 22 but showing a different form of device for modifying the plastic coating on the article, and Fig. 24 is a fragmentary top plane view of the device in Fig. 23 showing the cam arrangement for actuating the movable members of the device.

Two machines for practicing the method of the invention are illustrated in the drawings and they are particularly adapted for precision application of plastic material to such articles as the electric light bulb sockets illustrated in Figs. 13 and 21. Each machine in general comprises means for successively conveying articles to be plastic coated through various operating zones arranged in sequential order and from one end to the other end of the machine including a preheating chamber, a plastic solution dip tank, a heat curing chamber, a cooling or chilling chamber, mechanism for trimming excess plastic, and mechanism for ejecting the plastic coated article. In addition, as shown and described in connection with the second embodiment of the invention, the machines may include mechanism after the curing chamber for modifying the plastic coating by impressing a design or set of characters into the coating which will appear on the finished coated article.

Referring particularly to Figs. 1 and 1A, the machine therein comprises a supporting frame including a vertical floor engaging frame member 10 at the forward end of the machine and a similar vertical frame member 12 at the rear or discharge end of the machine. These two members are connected together by a pair of horizontally extending members 14—14 which may be of L-shaped cross section and arranged in parallel spaced apart relationship and in the same horizontal plane as shown in Figs. 5 and 10. The horizontal members 14—14 extend from one end to the other end of the machine and may be relatively long such as from 20' to 50' or more in length.

Extending the full length of the machine is an endless conveyor 16 which is formed of a sprocket chain consisting of a plurality of overlapping pivotally connected links of a conventional type. The endless chain 16 is supported for longitudinal travel along the machine by means of sprocket wheels located at the opposite ends thereof. One such sprocket wheel is indicated at 18 at the forward end of the machine and a similar sprocket wheel 20 is located at the rear end of the machine. Each sprocket wheel is mounted in a conventional journal box of the character shown at 22 and supported thereby upon the horizontal frame members 14—14 of the machine. The endless conveyor chain is wrapped around the sprocket wheels and the individual links thereof successively engage the teeth of the sprocket wheels. The endless conveyor is continuously moved in one direction by any suitable means such as that shown at the right of Fig. 1A and comprises an electric motor 24, pulley 26, an endless flexible belt 28 coupling the motor to the pulley 26, a separate gear wheel 30 drivingly coupled to the pulley wheel, and an endless drive chain 32 extending vertically upwardly from the gear 30 and engaging a gear wheel 34 fixed to the shaft on which the sprocket wheel 20 is mounted.

Various operating elements are suspended from the horizontal frame members 14—14 along the length of the machine. At the forward end of the machine is a preheating chamber generally indicated at 36. Immediately following the preheating chamber is a plastic solution applying device including a dip tank generally indicated at 38. Immediately after the plastisol containing dip tank is a final heating or curing chamber generally indicated at 40. Following the heating or curing chamber is a cooling or chilling chamber 42 which is located close to the discharge end of the machine. Between the cooling chamber 42 and the rear end of the machine is a plastic coating trimming and ejecting mechanism including a cutting device generally indicated at 44. These various operating elements are suspended from the horizontal frame member 14—14 in positions below the level of the lower section of the conveyor chain. The preheating chamber 36 is suspended from the frame members 14 by means of vertical bars 46. Similarly, the secondary heating chamber 40 is suspended by bars 48 and in like manner the cooling chamber 42 is supported by bars 50. Dip tank 38 is supported on a yielding platform in a manner hereinafter described and below four vertical extending posts 52 aligning with the corners of the tank.

The articles are usually attached to the conveyor 16 at the forward end thereof and advanced by the lower section of the conveyor toward the rear end of the machine as indicated by the arrows in Figs. 1 and 1A. The articles are carried in suspended relation to the lower section of the conveyor chain so as to pass through the preheating chamber 36, over and into the dip tank 38, through the secondary heating chamber 40, through the cooling chamber 42 and thereafter moved by the trimming and ejecting mechanism at the end of the machine. The articles are individually connected to the conveyor chain 16 and suspended therefrom as previously mentioned in such a manner that they may be both independently rotated and moved vertically relative to the conveyor. For this purpose, separate article attaching devices or hangers are carried by the conveyor which are equipped with means for providing rotatable and axial movement of the article attached thereto.

Specific reference is made to Figs. 3, 4, and 5 for an understanding of the construction of one preferred type of article suspending device or hanger. Each hanger comprises in general an inverted U-shaped member 54 which extends crosswise of the longitudinal dimension of the machine. Each depending arm of the hanger is provided with a rotatable and vertically reciprocating member or plunger 56 which is shaped at its lower end to releasably receive an article to be coated. Each arm of the hanger is shaped to receive and support a coiled spring 58 seated at its lower end on the arm and seated at its upper end on a stop or washer 60 secured to the plunger. It is evident from this construction that each spring 58 yieldingly urges its responsive plunger 56 in an upward direction. Each plunger 56 reciprocates and rotates in two vertically spaced apart bushings 62 fixed in the hanger arm in which it is associated. Located below the lower bushing of each plunger assembly is a small wheel 64 which is fixed to the plunger for joint rotation by any suitable means such as the pin 65. The abutment of the wheel with the lower bushing limits the upward travel of the plunger as urged by the spring. The peripheral surface of each wheel 64 is preferably enclosed by frictional material in the form of a circular band 66 of rubber or like material. As hereinafter described, this wheel is utilized to rotate the plunger assembly including the article while the same is advanced by the conveyor and particularly during the time the article is immersed in the plastic solution of the dip tank 38.

The lower end of each plunger 56 is shaped to detachably receive an article. For this purpose each plunger is widened at its lower end to form a downwardly opening cup-shaped element or chuck 68 as shown at the right in Fig. 3. Slidably fitting the interior of the chuck and vertically movable therewithin is a sleeve 70 which is used as an ejector for dislodging the article from the plunger at the rear end of the machine. The ejector sleeve is coupled to a control member which is in the form of a ring 72 exteriorly located on the chuck and encircles the same as is evident in the plunger assembly at the left of Fig. 3. A pair of oppositely disposed vertical slots 74—74 are formed in the chuck and pins 76—76 extending through these slots couple the ring to the ejector sleeve for joint axial movement in the chuck body.

The article receiving end of each plunger may be constructed to suit the particular article to be plastic coated. For the purpose of demountably receiving a light bulb socket of the character shown in Fig. 13, the lower end of each plunger 56 is provided with a downwardly opening axial bore 78. Received in the bore and fixed therein by the pin 65 is a stem 80. The stem projects downwardly into the chuck portion 68 and is shaped at its lower end to form an arbor 82 having a greater diameter than the stem. The lower end of the arbor is peripherally indented by means of two reversed conical sections 84 and 86. The adjoining portions of the two conical sections form a peripheral recess for receiving the lower end of the light bulb socket or other article to be plastic coated.

Although one particular form of light bulb socket is herein illustrated it is understood that it may be otherwise constructed and assume different shapes. Referring to Fig. 13, the light bulb socket herein shown comprises a two-part shell formed of an inner sleeve 88 of substantially cylindrical formation and an outer sleeve 90 of general conical formation. The lower end of the inner sleeve is inturned as at 92 and it is this portion of the socket which enters the peripheral recess formed by the reversed conical sections 84 and 86 of the arbor 82. The lower portion 94 of the outer sleeve 90 closely hugs an intermediate part of the inner sleeve and is rigidly connected thereto such as being solidly crimped in place around the inner sleeve. The outer sleeve flares outwardly and upwardly from its point of connection to the inner sleeve and projects to a height above the upper end of the inner sleeve. The upper end section of the outer sleeve is provided with an outwardly extending circular flange or shoulder 96 which is formed in the illustrated socket by bending or folding the sleeve upon itself in the manner shown in Fig. 13. The flared portion of the outer sleeve is split longitudinally and divided into a circular series of resilient prongs or fingers 98. The fingers are separated from one another by narrow V-shaped slits 100 which preferably extend as shown through the shoulder 96 and terminate just short of the secured bottom portion 94. The inner sleeve may be provided with a pair of opposed bayonet type slots, one of which is shown at 102.

In the use of the socket of Fig. 13, and this applies to other forms of lamp sockets, it is mounted in a fixed support such as an instrument panel, back plate of a light housing and the like. The outer ends of the fingers 98 are contractually sprung into an aperture in the supporting member or plate bringing the shoulder into abutment with the marginal portion of the supporting member surrounding the aperture. The balance of the socket beyond the shoulder projects perpendicularly to the supporting member and is usually located in relatively exposed condition subject to moisture and dust. The process and machine of this invention is intended to seal this projecting part of the socket by applying a coating 104 of plastic composition to the exterior surfaces thereof which is so precisely applied that it will not extend beyond a given point on the socket to interfere with the installation and removal of the socket yet will provide a complete seal for the exposed surfaces of the socket. In order to form a tight joint between the shoulder 96 and the supporting member in which the socket is installed and thereby seal the same against admission of fluid and dust and to prevent the escape of stray light, the plastic coating applied by the present machine just sufficiently overlies the shoulder including the abutting forward side thereof but leaving the extremities of the fingers 98 free to interengage with the edge of the aperture in the supporting member. As shown in Fig. 13, the plastic coating 104 extends around the shoulder 96 forming a plastic film or layer 106 on the forward or finger side of the socket but without overlying the extremities of the fingers. The machine of the present invention is designed to apply an evenly distributed coating of plastic on the sockets or other articles conveyed through the machine and to automatically stop off or limit the extent of the coatings on all the articles at the precise point.

The socket or other article to be coated is fitted endwise onto each arbor 82 of the conveyor chain and is releasably retained thereon such as by frictional engagement of the socket with the arbor. This is accomplished by making the inner diameter of the chuck member 68 slightly undersize the normal expanded condition of the fingers 98 of the socket and by giving the chuck an axial dimension greater than that of the ejector sleeve 70 so that when the socket is fitted onto any one of the arbors 82 the fingers are caused to engage and lift the ejector sleeve as they are contracted to enter the chuck body. The result is, as shown in Fig. 3, that the fingers of the socket are grippingly engaged by the lower end of the chuck and held onto the arbor in this manner. The socket or other articles to be plastic coated are attached to the empty hangers as they are returned along the upper section of the conveyor 16 or as they pass around the forward sprocket wheel 18.

Each hanger 54 is attached to the conveyor chain 16 by means of a pair of right angularly shaped brackets 108. The closed end of the U-shaped formation of each hanger is secured to the pair of brackets in any manner such as by welding. The upturned portions of each bracket 108 is secured to a link of the conveyor chain 16 such as by being coupled to the opposite ends of the pin 110 thereof. A spacer 112 is provided on each pin 110 to position the brackets in the lateral spaced apart relationship shown in Fig. 3. In this manner the hangers 54 are carried by the conveyor chain throughout its movement, being suspended from the lower section of the chain as it passes through the various operating zones of the machine. As shown in Fig. 3 and in other figures of the drawings, the plungers 56 of each hanger project upwardly thereabove and to a height above the conveyor chain.

The hangers 54 with the articles to be plastic coated are first conveyed through the preheating chamber 36 to heat the assemblies to the desired temperature for receiving the plastic coating material. The preheating chamber 36 contains heating means of any desirable character such as electrical wires 114 imbedded in insulating blocks 116 or the heating means may consist of a pair of opposed banks of heating lamps arranged longitudinally in the chamber. In the particular form of heating means shown in Fig. 3, the wire containing insulating blocks 116 are arranged in close proximity to the article being conveyed through the chamber and in the opposed inclined relation shown in Fig. 3. The heating blocks for the longitudinal series of articles suspended by the conveyor are supported in the V-shaped relationship by upwardly diverging plates 118—118 which are mounted upon and secured to the floor 120 of the preheating chamber. The preheating chamber is partially surrounded by a wall of insulating material indicated at 122—122 on opposite sides of the two series of heating blocks and serve to confine the heat therewithin. A central subsidiary insulating wall 124 may be provided along the top of the preheating chamber 36 between the two series of V-shaped heating assemblies.

After passage through the preheating chamber the articles are conveyed to the plastic coat applying zone constituted by the dip tank 38. Plastic coating material in the dip tank 38 is maintained at a precise level by the provision of an inner smaller receptacle 126 of the character shown in Fig. 5. The smaller receptacle 126 continuously receives flowable plastic material by means of a conduit 128 entering the bottom thereof as shown in Figs. 4 and 5. The plastic solution thus emitted fills the receptacle 126 to the upper edge thereof and excess material overflows from the receptacle 126 into the larger surrounding tank 38. The excess material received by the larger tank is exhausted therefrom through conduit 130. Suitable pump means (not shown) is provided for continuously circulating movable plastic material through the conduit 128 into the receptacle 126 and exhausting and returning the excess material to the inlet of the pump by means of the conduit 130.

The articles including assemblies suspended from the conveyor chain are moved across one end wall of the receptacle 126 of the dip tank and are successively immersed in the solution contained therewithin to the desired depth and moved therethrough to receive a coating of plastic material. As shown in Fig. 4, each article suspending device conveyed by the hangers is initially carried over the front end of the receptacle 126 and then thereafter immediately dipped into the plastic solution. This is accomplished by means acting on the plungers 56 depressing the same against the resistance of the springs 58. The plunger depressing means comprises a lever 132 pivoted at 134 on a stationary support at 136. The outer extremity of the lever 132 is provided with a pair of depending hammer-shaped heads 138—138 which, as shown in Fig. 5, are located in alignment with the path of the travel of the two series of plungers.

Acting on the lever 132 to depress the same and the heads 138—138 is a cam member 140 driven from the operating mechanism of the machine. The cam is fixed to a cross shaft 142 on the outer end of which, as shown in Fig. 5, is a small gear wheel 144. The latter meshes with a larger gear wheel 146, as shown in Fig. 1, is coupled by means of an endless belt 148 with the forward sprocket wheel 18. The gear relation between the wheels 144 and 146 and the shape of the cam 140 is such that as each hanger 54 moves under the outer extremity of the lever 132 the latter is caused to be depressed by the rotating cam causing the heads 138—138 to engage the pair of plungers carried by the hanger and depress the same. The relationship of these parts is such that the downward swinging movement of the lever 132 is timed to engage the upper ends of the plungers 56—56 of each hanger and depress the same to a lower level.

Positioned in alignment with each longitudnial series of plungers 56—56 and located below the normal level of the upper ends of the plungers is a guide plate 150 which holds the plungers and the articles attached thereto in depressed condition as the latter are moved through the solution. Each guide member 150—150 is located immediately following the hammer-shaped head 138—138 of the lever on its respective side of the conveyor so as to immediately receive thereunder the depressed plunger as it is moved from the head to the guide plate. As shown in Fig. 4, each plunger hold-down plate 150 is of a length so as to maintain the article immersed in the solution for the major portion of the length of the receptacle 126. Each guide plate 150 is rigidly supported in its respective position and may be connected to the under side of the stationary block 136. The rear end of the guide plate and the stationary block 136 may be inclined in a common plane as shown at 152 to permit the plungers to rise relatively slowly as they approach the rear end of the receptacle 126. It is evident that as soon as the pressure is released on each plunger it will be urged to its projected position by its spring 58.

During the movement of the assembly through the solution of the receptacle 126 it is caused to be rotated on a vertical axis in order to evenly distribute the plastic coating thereon. This is accomplished by providing means which is responsive to the longitudinal movement of the conveyor to rotate the plunger and the article while immersed in the solution. Referring particularly to Figs. 4 and 5, there is provided a member 154 adjacent to each plunger 56 which is provided with a vertical face for engagement with frictional material 66 of the plunger wheels 64. The two plates 154—154 may be positioned on the inside of their respective series of plungers and connected together by a supporting member 156, as shown in Fig. 5. The level or height of the two members or plates 154—154 above the solution is such that the wheels 64—66 of each plunger assembly are only engageable therewith when the assembly is in depressed condition. When thus engaged and moved by the conveyor each plunger assembly is caused to be rotated about a vertical axis.

For occasional inspection of the plastic solution, it is desirable to provide means for lowering the dip tank below the lower ends of the articles on the plungers. Means for so lowering the dip tank is shown in Fig. 5 and comprises a platform 158 upon which the dip tank is mounted which is resiliently supported in raised position by coil springs 160 located at each corner of the platform. Suitable studs entering the upper and lower ends of each spring serve to support the springs and the platform for vertical travel. A base 162 which may engage the floor serves as a bottom support for the springs and the platform. There is provided a foot treadle 164 having one end pivoted at 166 to an upright supporting member 168 secured to the base 162. The opposite end of the treadle projects outwardly from the machine at a slight upward inclination, as shown in Fig. 5, in order to be engaged by a foot of the operator. The platform 158 is connected to an intermediate portion of the foot treadle 164 by means of a link 170 pivotally connected to the platform at 172 and to the treadle at 174. It is evident that upon depression of the outer end of the foot treadle it will lower the platform 158 and carry the dip tank and one receptacle 126 therewith exposing the solution to view and the lower immersible portions of the articles suspended from the plungers. Adjustable stops 176 are provided on the frame members 152 for limiting the upward movement of the dip tank. These stops are preferably in the form of bolts, as shown, capable of being threadedly adjusted to vary the extent they project below the frame members.

After the plungers and the articles assembled thereon have been raised to their normal height following passage through the plastic solution they are moved longitudinally through the secondary or final heating chamber 40 which may be similarly constructed as the preheating chamber 36. The heating means in the final heating chamber 40 may be high resistant electric wires of the character previously described or longitudinal banks of heating lamps.

Thereafter the hangers with the articles assembled thereon are passed through the chilling or cooling chamber 42, a cross sectional view of which is shown in Fig. 8.

This chamber is provided with upwardly opening V-shaped channels 180—180, one for each longitudinal series of plungers. These channels are so positioned as to overlie the opposite sides of the articles passed therethrough as shown in Fig. 8. The chilling chamber may contain any suitable cooling means such as Dry Ice, indicated at 182, and the walls thereof may be insulated, such as indicated at 184. The chilling action cools the plastic material coated on the articles as well as the plunger assembly and imparts a permanent set to the plastic coating.

When the article is lifted out of the plastic solution there is usually a small sleeve-shaped bulbous mass of plastic material depnding downwardly from the lower end of each article. Such a bulbous extension of the plastic coating is indicated at 186 in Fig. 13. At the rear end of the machine there is provided mechanism for shearing this bulbous mass from the balance of the coating and for ejecting the coated article from the machine.

Referring particularly to Figs. 9 and 10, the machine is provided with suitable cutting means in the form of rotating knives for shearing the bulbous mass or masses from the articles. Associated with each longitudinal series of plunger assemblies are two rotating knives 188 and 190 extending in horizontal planes, but in slightly offset relationship to one another and arranged so that the cutting edges on their respective peripheries slightly overlap upon one another. Each knife is fixed to a rotatable vertical shaft 192 which is journaled for rotation in a horizontal supporting plate 194. Below the plate 194 are a series of engaged gear wheels which couple the shafts one to another for joint rotation about their respective axes. One of the shafts is elongated, as shown by the leftmost shaft in Fig. 10, and is coupled to the driving mechanism of the machine by means of bevel gears 196 and 198, sprocket gear 200, sprocket chain 202, larger sprocket wheel 204 which is fixed to a cross shaft 206 extending above the lower section of the conveyor chain 16. A centrolly located gear wheel 208 fixed to the shaft 206 engages the links of the lower section of the conveyor chain and is rotated as the chain advances longitudinally of the machine. In this manner the two sets of cutting discs or knives 188 and 190 are rotated.

As the plunger assemblies move in over the cutter knives they are slightly depressed to bring the plastic protuberances 186 on the articles into the plane of the knives. As shown in Fig. 10 there is provided a cam plate 210 having a slightly upwardly inclined forward extremity 212 which engages the wheels 64 of each plunger assembly and slightly depresses the assembly to bring the plastic protuberance into the plane of the cutting knives. As the protuberances 186 pass through the knives they are sheared off and permitted to fall away from the machine.

Immediately following the removal of the bulbous portions or protuberances 186 from the articles the articles are ejected from their respective plunger assemblies. As shown in Figs. 9 and 10, shelf means in the form of two oppositely disposed plates 214 are provided which engage the control ring 72 of the ejector sleeves of the plunger assembly and forces them downwardly to eject the article from the chuck body 68. A set of opposed plates 214—214 are provided for each longitudinal series of plunger assemblies and, as shown in Fig. 9, each plate is provided with a similar slightly downwardly inclined face 216 which acts as a cam to progressively depress the control ring and ejector sleeve as the plunger assembly moves thereby.

During its passage through the preheating chamber, the assembly including the arbor and the article attached thereto is heated to the desired amount for receiving the plastic material. Following the immersion in the plastisol of the dip tank 38, the higher temperature of the final or heat curing chamber 40 is such that the plastic coating has no or very little tensile or hardness strength. During the passage through the cooling or chilling chamber 42, the tensile or hardness strength of the plastic coating is raised to such a level that it is easily cut through or severed by the knives 188 and 190. The function of the cooling or chilling chamber 42 is to lower the temperature of the assembly, preferably to an abnormally low temperature, to stop further curing action and to harden the plastic material to such a tensile or hardness strength that it may be easily severed by the cutting knives 188 and 190 and such that the article may be immediately handled for storage or shipment after ejection from the machine.

*Second embodiment*

The modification illustrated in Fig. 14 follows the process previously described but the parts and sections of the conveyor system are shown in modified form. Referring to Fig. 14, there is schematically shown a closed conveyor loop in the form of an endless link chain 220 engagingly extending around the upper sprocket wheels 222—222 and two lower sprocket wheels 224—224. In this particular embodiment of the invention, the endless flexible chain 220 carries only one row of article suspending hangers rather than two parallel sets as in the previously described embodiment of the invention. To foreshorten the length of the machine and thereby conserve space, at least one of the article treating portions encloses a section of the conveyor other than along its bottom horizontal section. Referring to Fig. 14, it is to be noted that the means for preheating the article assemblies is located in the upper right hand corner of the drawing and extends alongside of a portion of the upper horizontal section of the conveyor and along the adjacent vertical section of the conveyor. The heating means may be electrical wires of the character described in Fig. 2, but are herein shown as opposed banks of electric heating lamps 226 arranged on opposite sides of the conveyor system so as to heat the article assemblies as they pass therebetween. In the schematic showing in Fig. 14 only one row is illustrated but it is understood that a similar row is provided along the opposite side of the path of travel of the article assemblies.

The articles to be coated in the embodiment of the invention illustrated in Fig. 14 are preferably assembled on the upper horizontal portion of the conveyor system and an elevated platform may be provided for supporting an operator in position to attach the articles to the article suspending devices carried by the conveyor. The articles to be coated are then conveyed along the upper horizontal section of the conveyor and past the heating elements 226 as they round the upper right corner of the system and commence traveling downwardly along the right side thereof.

Disposed below the right hand section of the conveyor system as illustrated in Fig. 14 is a dip tank 228 containing plastic material in flowable condition. This plastic material is indicated at 230 and is maintained at a constant level in the tank. The location of the tank is such that it underlies the lower right sprocket wheel 224 as viewed in Fig. 14 so that as the article assemblies are carried around the wheel they are directly immersed into the plastic solution at one end of the tank. During its movement through the solution of the tank, the article assemblies are rotated about vertical axes in the manner hereinafter described. As the article assemblies approach the end of the tank opposite to that which they entered they are lifted out of the tank by inclining the conveyor chain 220. As they pass out of the solution and for a substantial distance thereafter, the article assemblies are conveyed through the heat curing zone which is represented by one of a pair of opposed banks of heating lamps 232. In Fig. 14, the second heating zone is broken away but it is understood that it will extend for a substantial distance to heat the assemblies to the desired amount.

After the passage from the secondary heating zone 232, the article assemblies are conveyed by the chain 220 through a chilling zone generally indicated at 234 and represented by an outer tank 236 and an inner tank 238.

These two tanks contain a chilling fluid maintained at a temperature of approximately 0° F. The chilling fluid is continuously circulated from the outer tank to the inner tank and return to form a closed circulatory system to maintain the fluid at the desired level for completely immersing the article assemblies therein. For this purpose, a pump 240 is provided, the intake conduit 242 thereof entering the upper portion of the inner tank 238.

In the opposite end walls of the inner tank 238 there are provided two slots 246—246 aligning with the path of travel of the suspended article assemblies and permitting the same to pass therethrough. The opposite end walls of the outer tank 236 are likewise provided with slots 248—248 which align with the slots of the inner tank and likewise permit the passage of the article assemblies therethrough. As indicated in Fig. 14, the coolant fluid in the inner tank is permitted to flow out of the slots 246—246 and return to the outer tank. The pump 240 operates at such a speed as to maintain the liquid level of the inner tank close to the upper edges thereof and sufficient to immerse a substantial portion of the plastic coating on the article assemblies as they pass therethrough. During their passage through the cooling zone, the article assemblies may be rotated about vertical axes and slightly dislodged from their arbors to assure complete cooling of the interior thereof as hereinafter described.

After leaving the cooling zone 234, the article assemblies are conveyed into a trimming zone generally indicated at 250 where any excess plastic material is removed from the assemblies. As schematically shown in Fig. 14, the trimming mechanism may be in the form of two rotating disc-like knives 252 and 254 arranged similar to the knives 188 and 190 and slightly overlapping one another. The knives 252—254 are predisposed at a level such as to sever or snip off the pendulous plastic mass at the bottom of an article assembly. Following the severing of the excess plastic material the article assemblies may be ejected from the conveyor in a manner similar to that described in connection with Fig. 10 or removed by hand.

In the operation of the modified system shown in Fig. 14, the temperature of the various operating zones may be comparable to those previously described in connection with the system of Figs. 1 and 1A. The conveyor chain 220 is operated continuously and successively advances the article suspending arbors through the treating zones without stoppage. In this as well as the preceding embodiment of the invention, the temperatures of the preheating zone and the rate of speed can be regulated to vary the thickness of the deposit of the plastic material on the articles and the adjacent portions of the hanger assembly to which they are attached. A slow rate of travel of the articles through the plastic solution of tank 228 will cause a formation of a thicker coating of plastic on the article. A faster rate will cause a thinner coating to be formed on the articles. At whatever speed the conveyor is driven, the temperatures of the preheating zone may be adjusted to vary the thickness of the plastic coating applied during the dipping operation. The lamps in the two heating chambers 226 and 232 are preferably infra-red heating lights and the heating effect produced by these chambers may be conveniently regulated by cutting in or cutting out one or more of the heating lamps in their respective banks of lamps.

The embodiment of the invention illustrated in Fig. 14 is designed to apply a plastic coating to an article which not only coats certain exterior portions thereof but forms a functional extension on one end thereof and a projecting resilient lip on the opposite end for sealing engagement with a supporting member or supplemental part to which the article is connected. For illustrative purposes, there is shown a lamp socket in Fig. 21 and at the bottom of Fig. 15 which is so modified and functionally improved in this manner. After the type of article shown in Fig. 21 is passed through the apparatus it comes out having its length more than doubled and with the resilient sealing lip previously mentioned. The socket of Fig. 21 is generally composed of two exterior parts, a hollow end opening body portion 256 into which a lamp bulb is inserted, and a non-circular hollow body portion 258 having a radially extending circular flange 260. The two body portions are connected together into a unitary assembly by fastening elements which are herein shown as tongues 262 forming extensions to the circular portion 256 and projecting through slits in the circular flange and turned over. The end wall of the body portion 258 is provided with an aperture or slot 264 through which the wires to the lamp socket terminals extend.

In the embodiment of the invention illustrated in Fig. 14, the conveyor is composed of two endless sprocket chains 266—266 disposed in side-by-side parallel relationship. The individual links of each chain overlap upon one another and are pivotally connected together in the conventional manner by transversely extending pivot pins 268 as shown in Fig. 18. Every alternate pivot pin 268 carries a roller 270. The two conveyor chains are guided by their rollers along their horizontally extending portions by tracks or rails 272 of L-shaped cross section as shown in Figs. 15, 16 and 17. These rails are rigidly supported on the frame work of the machine by struts 274 and arranged with the horizontal portions of their L-shaped configurations extending toward one another on the same plane. Each sprocket wheel 222—222 and 224—224 at the corners of the machine is a dual wheel assembly, one wheel for each chain. As shown in Fig. 14, each sprocket wheel is notched at spaced intervals around its periphery to form semi-circular recesses 276 of substantially the same radius as the rollers 270. These recesses are so angularly spaced around the axis of the sprocket wheel that as the latter rotates it will successively receive the rollers of the chain passed therearound.

As previously mentioned the conveyor 220 of the machine illustrated in Fig. 14 is designed to carry a single row of article suspending devices or hangers. These hangers are similarly constructed and are generally identified by the reference character 278 in Fig. 14. The hangers of the machine modification in Fig. 14 are designed to provide an elongated plastic extension on one end of the article and a circularly formed sealing lip of plastic on the other end of the article. It is understood that the features hereinafter described in connection with the hanger assemblies 278 of Fig. 14 may be incorporated in the hangers of the earlier described embodiment of the invention and that the features of the latter may be employed in the hangers of the system in Fig. 14.

Each article suspending device or hanger 278 is supported from between each pair of axially aligned rollers 270—270 on the two conveyor chains 266—266. For this purpose the pivot pin 268 about which each roller is journaled is provided with an L-shaped bracket 280 located on the inside of the chain and facing the opposite chain as shown in Fig. 15. Each hanger 278 includes a shouldered body 282 having a circular flange 284 forming the shoulder. The flange 284 of each body is secured by bolts 286 to one pair of oppositely disposed brackets 280—280 and is suspended therebetween in the manner illustrated in Figs. 15, 16 and 17.

The body 282 of each hanger is provided as shown in Fig. 19 with a vertical circular bore 288 in which is received a bushing 290. Within the bushing is a sleeve-shaped spindle 292 which has a length such that it projects beyond the opposite ends of the body. Detachably secured to the lower end of the spindle and forming an extension thereof is a tapered arbor or forming member 294. The larger or upper end of the arbor as viewed in Fig. 19 is provided with an externally threaded reduced extension 296 which is threadedly engaged with internal threads in the lower extremity of the spindle. Such form of attachment enables the arbor to be readily removed and if desired replaced by an arbor of a different configuration.

The arbor preferably has a cross section at its upper end substantially the size and shape of the aperture 264 of the socket or other article placed on the hanger. The arbor may progressively taper on all sides from this larger dimension to the lower tip thereof.

Fixed to the spindle 292 below the bushing 290 is a downwardly opening cup-shaped element generally indicated at 298 and forming a chuck body for detachably holding the article on the arbor. The chuck body of the hanger device 278 exhibits a bell-shaped configuration being narrow at the top and wider for the major portion of its length to form an interior annularly shaped space or chamber around the spindle. Preferably the chuck 298 is formed in two parts, carrying on the lower end thereof a detachable article receiving member 300 which may have an interior dimension conforming to the chamber of the chuck. As illustrated herein, the part 300 is ring-shaped and is attached to the main body portion of the chuck by a threaded engagement therewith, as shown in Figs. 19 and 20. This permits the part or member 300 to be readily detached and replaced by a part of a varied construction in order to modify the hanger for different types and shapes of articles. The chuck is fixed to the spindle and is thereby jointly rotatable therewith by means of a cross pin 301 which extends completely through the spindle and has its opposite ends fitted into the upper end of the chuck. Fixed to the upper end of the chuck 298 is a wheel 302 which serves the same purpose as the wheel 64 previously described but in this instance it is provided with teeth 304 on its periphery as best shown at the right of Fig. 18.

The spindle 292 is provided with an enlarged head in the form of an outwardly projecting circular flange 306 above the bushing 290. Between the head and the bushing there is interposed a coiled spring 308. The latter is under compression and normally yieldingly forces the chuck 298 against the lower end of the bushing. The spring mounting provides a limited resisted downward movement of the spindle relative to the bushing and the body 282.

Reciprocably mounted within the hollow spindle 292 is a cylindrical member or plunger 310. When an article is assembled on the arbor and held by the chuck, the upper end of the plunger normally projects above the head 306 of the spindle in the manner shown in Fig. 19. The plunger has a length such that it extends part way into the area circumscribed by the wider portion of the chuck and terminates in spaced relation above the threaded extremity of the arbor. Opposite to the upper narrow portion of the chuck the plunger is provided with a transverse slot 312 through which the cross pin 301 extends. The slot opens on opposite sides of the plunger and has a longitudinal dimension sufficient to permit the plunger to reciprocate a limited distance in the spindle.

The plunger 310 operates an ejector in the wider portion of the chuck for dislodging an article therefrom. The ejector is in the form of a sleeve 314 having a diameter such that it may engage the upper end of the article inserted into the chuck. The upper end of the ejector sleeve 314 is turned inwardly on all sides as at 316 to relatively closely embrace the spindle but spaced sufficiently therefrom so that the ejector is freely movable therealong. The hollow spindle is provided with a pair of diametrically opposed longitudinally extending slots 318—318. Connected to the inturned portions of the ejector sleeve and extending crosswise through the slots is a pin 320. The pin serves to connect the ejector to the spindle for joint rotation therewith. However, the pin together with the ejector has a limited axial movement in the chuck permitted by the slots 318.

The article, such as the lamp socket illustrated in Fig. 21 and in the lower part of Fig. 15, is slidably fitted onto the arbor 294 of the hanger and its upper end is forced into the ring-shaped member 300 of the chuck body. Means is provided in the interior of the chuck body for frictionally gripping and holding the upper end of the article such as the circular portion 256 of the lamp socket. Such means is herein illustrated as a split ring 321 carried by the lower part 300 of the chuck body and normally having an internal diameter slightly less than the portion of the article embraced thereby. The split ring is capable of being radially expanded when the article is forced therethrough, thereby tightly gripping and holding the article to the conveyor hanger. When the article is forced into the chuck in this manner it raises the ejector sleeve to the upper limits of the slots 318 and the ejector assumes the position shown in Fig. 19. The socket or other type of article is forced up into the chuck until the flange 260 abuts the lower end thereof. In this position the tapered arbor 294 is substantially completely exposed below the lower end of the article and provides a forming member for forming a tubular extension of the plastic coating.

An important feature of the invention is the chamfered or tapered character of the lower end of the chuck 298 which constitutes a molding member having a molding surface 322. As best shown in Fig. 20, the lower end of the chuck body is beveled to provide a generally conical mold surface 322 which may be further shaped with a rounded ridge 324 extending completely around the beveled face. The beveled or chamfered characteristic of the lower end of the chuck cooperates with the flange 260 of the article to form a generally V-shaped peripheral recess as best shown in Fig. 16, into which plastic may flow during the dipping operation as hereinafter described.

Thus attached to the hanger, the article together with the hanger is passed successively through the preheating zone 226, dipping tank 228, curing zone 232, cooling zone 236—238 and between the knives 252—254. During its passage through the preheating zone the hanger and article assembly is heated to the desired temperature for entering the dip tank. The article and hanger assembly is swung around the sprocket wheels 224 in the lower right hand corner of the schematic view of Fig. 14 and enter the plastic solution 230 in the dip tank. As in the previously described embodiment of the invention, the solution 230 is maintained at such a level that when the article assembly is horizontally conveyed therethrough it is immersed to the desired extent. In the practice of this invention, the article assembly is dipped at least to the extent that as shown in Fig. 16 the upper surface of the plastic solution is on the level of the upper edge of the beveled face 322 of the chuck body. So dipped, the plastic solution covers the beveled face and the flange 260 of the article. The upper portion of the article received within the chuck body is protected by the latter from contact with the plastic solution. The result is that when the process is completed the plastic material extends around the outer margin of the flange 260 and forms a relatively thick upwardly and outwardly flaring lip 326 having an interior surface configuration corresponding to the beveled mold surface 322 and the ridge 324 thereon. By thus extending around the flange and overlapping the upper surface thereof, the plastic coating is interlocked with the flange. In the finished product, the thickened flaring lip 326 of plastic material constitutes a resistantly deflectable sealing member or ring for compressibly engaging a part to which the article is connected such as the marginal portion of a hole in a supporting member into which the uncoated protected portion of the article or socket is inserted. In this manner the lip 326 forms a watertight, dust proof seal abutting the part to which the article is connected and surrounding the hole or other recess into which the uncoated portion of the article is received.

As in the previously described embodiment of the invention, the hanger assembly including the article is dipped to a precise depth in the plastisol contained within the tank 228. This is accomplished in a manner similar to that employed in the earlier described embodiment of the invention and functions to hold and guide the article assemblies as they travel through the dip tank. Referring to Figs. 14 and 16, an adjustable camming and guide member 328 is provided above the conveyor track rails 272—272 and centrally therebetween. The guide member is shown as being channel-shaped in cross section and disposed with its channel opening downwardly in straddling relation to the upper projecting ends of the plungers 310. The channel guide member is adjustably mounted so that the lower edges of its two side walls 330—330 are engageable with the circular heads 306 of the hollow spindles 292 as the article suspending devices are advanced by the conveyor thereunder. The guide member is disposed at such a level with respect to the devices that it depresses the heads 306 and the spindles associated therewith against the resistance of their respective springs 308 as indicated by a comparison of the head 306 in Fig. 16 with the heads in Figs. 15 and 17. This depressible movement of the spindles lowers the articles and arbors carried thereby to the precise depth desired in the plastisol of the tank 228. In the example illustrated in Figs. 14 and 16, this depressible movement lowers the plunger 310, chuck 298 and the article attached thereto of each hanger assembly to the extent that the surface of the plastisol 230 is on the level with the upper edge of the mold surface 322 of the chuck body.

As shown in Fig. 14, the channel camming member 328 extends the length of the horizontal portion of the conveyor 220 immediately adjacent to the dual sprocket wheel 224. Its forward end is preferably upwardly curved as at 332 to permit the heads 306 of the article assemblies to be gradually depressed as they round the sprocket wheel and commence to dip into the plastic solution of the tank. An important feature is the adjustability of the guide member to regulate the depth of the immersion. The guide member is adjustably supported at spaced points along its length upon a stationary part 334 of the machine in the manner illustrated in Fig. 16. The part 334 is provided with vertical slots 336 through which bolts 338 carried by the guide member extends. Nuts 340 threaded to the outer extremities of the bolts serve to clamp the guide member in any vertically adjusted position provided by the slots. This adjustment enables the article assemblies to be dipped to the precise depth desired and to adapt the machine for coating articles of different formations.

The remaining exposed balance of the article, such as the lower portion 258 of the socket, as well as the arbor or forming member 294, is coated with plastic material as it travels through the dip tank. In Figs. 17, 19 and 20, the plastic coating on the exposed portion of the socket or other article is indicated at 342, and the plastic coating on the arbor at 344. The plastic material for forming the coating may be of any type suitable for this purpose. A vinyl plastisol has been found highly desirable. Suitable means in the form of a heating coil 346 may be employed as shown in Fig. 16 for heating and maintaining the plastisol at the desired temperature. The preheated assembly as it is passed through the plastisol causes a gel-like layer to form on the immersed surface portions of the assembly. This layer in turn picks up additional liquid plastisol. By controlling the preheating temperature, a predetermined and precise coating thickness can be formed on the assembly.

In order to form a uniform coating on the article and hanger assembly, an important feature of the invention is the provision for rotating the assembly while immersed in the plastisol. As shown in Fig. 16 and also in Fig. 18, the toothed wheel 302 of each assembly is arranged to engage a row of upright pins 348 extending parallel to the path of travel of the conveyor and the article suspending assemblies. In the illustrated embodiment of the invention, these pins are supported upon a narrow shelf 350 which is carried by one of the guiding rails 272 and at a level slightly below that of the wheels 302. The shelf may take the form of an angle iron as shown and have its vertical section bolted or otherwise secured to a second angle iron 352 in the manner shown in Fig. 16. The pins 348 are spaced apart sufficiently to enter between the teeth of the wheels 302 as shown in Fig. 18, and it is evident that as the assemblies move along parallel to the shelf 350 they will be rotated about vertical axes throughout the length of the row of pins.

Each coated assembly is withdrawn from the dip tank 228 by travel up the inclined portion 272 of the conveyor and moves into the curing zone or oven containing the banks of heating lamps 232. As the assembly moves out of the tank a small thickened mass of plastic 354 is formed below the arbor 294. The coated assembly moves continuously through the oven 232 and is heated therein to a temperature which fuses the plastic coating. During travel through the curing oven or immediately thereafter the coating on the assembly may be subjected to pressure to modify it. For this purpose, there is provided a device either in or immediately adjacent to the discharge end of the curing oven 232. Such a device is generally indicated at 356 in Fig. 14 and separate modifications thereof are disclosed specifically in Fig. 22 and in Fig. 23. The device is arranged to apply pressure to one side or to all surface portions of the plastic coating and modify the formation it assumes after it leaves the dip tank.

After leaving the curing oven 232, each assembly including the article and the hanger to which it is attached is moved in a continuous manner into and through the cooling or chilling tanks 236—238. During its travel through the chilling tank it may be rotated in the same manner as in the dip tank in order to uniformly cool all of the parts of the article and the assembly. For this purpose, the cooling chamber may be provided with a shelf 358 similar to shelf 350 and provided with a row or a series of spaced apart pins 360 which are positioned to engage the teeth of the wheels 302 and cause the rotation of the assemblies.

An important feature of the invention is the provision for partially dislodging the article from the hanger while it is being cooled or chilled. This arrangement strips the plastic coating from the heated arbor 294 and the heated beveled edge 322 enabling the interior of the plastic coating as well as the exterior thereof to be quickly cooled and take a permanent set. As shown in Fig. 14, and also in Fig. 17, there is provided a bar 362 above the chilling tanks which is provided with an inclined lower edge or face 364. The bar is supported in such a manner that the upper end of the plunger 310 of each hanger will engage the inclined face 364 and be depressed thereby as the hanger and the article carried thereby are moved further through the chilling tank. The depression of the plunger to the extent shown in Fig. 17 will release the coated article from the split locking ring 321 within the chuck body 298 permitting the coated article to fall away therefrom. The coated article, however, is not permitted to fall completely away from the chuck and its arbor 294 during passage through the cooling zone but is held in close proximity to the chuck by means of a pair of similar shelves 366—366 which, as shown in Fig. 17, are located in submerged relationship in the cooling liquid of the chilling tank 238. The two shelves are arranged in parallel spaced apart relationship forming an elongated opening or slot therebetween through which arbor and the plastic coating 344 initially formed thereon is permitted to move. The two shelves 366—366, however, are spaced apart less than the width of the coated portion 258 of the article so that the latter rests on the inner margins of the shelves in the manner shown in Fig. 17. Thus supported, the coated article is carried by the arbor of the hanger through the chilling zone but in slightly dislodged apart relationship to the chuck body 298. The level of the chilling solution in the tank 238 is preferably maintained just below the plastic lip 326 as shown in Fig. 17 in order to obtain the maximum benefit from the cooling solution.

Each shelf 366—366 may be an angle iron of the character shown in Fig. 17 and welded or otherwise secured to two or more depending vertical members or metallic straps 368 located at spaced apart intervals along the conveyor chains. The upper ends of the straps 368 may be secured in any suitable manner to the rails 272—272 along which the hangers are guided.

The two article supporting shelves 366—366 are arranged to project out of the discharge end of the cooling tanks 236—238 as shown in Fig. 14 and beyond the cutting mechanism 250. In this manner the two shelves serve to support the article passing between the cutting knives 252 and 254. Beyond the cutter 250, the two shelves 350—350 terminate abruptly permitting the partially dislodged article to fall completely away from the hanger and in this manner be ejected from the machine. The two cutting knives 252 and 254 are arranged at such a level that they will snip off the small plastic mass 354 below the lower end of the arbor. The removal of this mass of plastic provides an end opening in the tapered plastic extension 344 of the article through which electrical wires may be led to the terminals in the socket. The article resulting from the embodiment of the invention illustrated in Fig. 14 is not only partially coated with plastic but in addition is provided with a plastic tubular extension in the form of a sheath 344 on one end and a plastic flaring lip 326 for sealing purposes near the other end.

The device 356 for modifying the coating material either while it is in the curing oven or immediately thereafter may be of the construction shown in Fig. 22 or that shown in Fig. 23. In both examples, the device comprises a member which is moved into engagement with the plastic material of the article sufficiently to indent the plastic or otherwise modify its formation while the plastic coating is still soft and moldable. As shown in Fig. 22, a movable member in the form of a cylindrical rod for indenting the surface of the plastic material is shown at 370 carrying a small wheel 372 on its inner end for engagement with the plastic coating on the article. The plastic indenting wheel 372 may be rotatably mounted between parallel legs 374—374 of a bifurcated formation on the inner end of the rod 370. The latter is mounted for reciprocating movement in a body 376 which is suspended by means of an arm 378 attached to one of the guiding rails 272. The rod 370 projects beyond the outer end of the body 376 and is connected to the lower end of a rocking lever 380. The form of securement of these two members is preferably a slot and pin connection, as shown at 382.

The rocking lever 380 is pivoted at 384 to a bracket 386 fixed to the guiding rail from which the arm 378 depends. The lever 380 extends above its pivotal mounting and is connected at its upper end to a reciprocating member 388 by means of a pin and slot 390. The inner end of the member 388 carries a roller 392 adapted to engage a cam member carried by each article suspending hanger. In this instance it is preferred to use the circular flange or head 306 of the spindle 292 as the cam member for the roller 392.

A spring 394 encircles the rod 370 and is seated at one end against the body 376 and at the other end against a stop member 396 fixed to the rod. The spring is under tension and yieldingly urges the rod 370 to the dotted position shown in Fig. 22. When the rocking lever 378 is moved to the dotted position shown in Fig. 22, the upper roller 392 is disposed within the path of movement of the cam or heads 306 of the article assemblies. It is thus apparent that when the roller 392 engages a cam member 306 of each article suspending hanger, it is forced outwardly causing the rocking lever 378 and the rod 370 to move to their respective full line positions shown in Fig. 22 bringing the plastic indenting roller 372 into abutting engagement with the plastic coating on the article. The roller 372 may carry any particular design configuration for impression in the plastic material, and it is shown in Fig. 22 as containing the letters of a word or words for impressing a trade name on the plastic coating of the article.

Certain adjustments may be provided on the device 356. For example, the rod 370 may be provided with a nut 398 which is threaded to the rod in the manner shown in Fig. 22 for longitudinal adjustment therealong. An auxiliary lock nut 400 may be provided for holding the nut 398 in adjusted position. The two nuts cooperate together to form a stop. The nut 398 will abut the body 376 limiting the amount of retractible movement of the rod 370 and consequently the amount of the inward movement of the upper roller carrying member 388.

In Figs. 23 and 24 there is shown a generally similar but modified form of the device illustrated in Fig. 22 and including an opposed set of rocking levers 402—402 each adapted to reciprocate a rod 404 similar to rod 370 previously described. Carried on the inner ends of the rods 404 are complementary molding members 406—406 which as shown have the configuration of the plastic coating and are adapted to substantially completely enclose the same therewithin when brought into complementary juxtaposed relation. The two molding members 406—406 may have their interior surfaces provided with design configurations of any desired formation in order to impress a particular design into the surface of the plastic material. The two molding members 406—406 are reciprocated toward one another simultaneously and are adapted to momentarily engage the coated article and immediately retract away therefrom. The movement of the two molding members and their respective rods 404 are controlled by the engagement of rollers 408—408 with the cam members or heads 306 of the article assemblies in the manner similar to that described in connection with Fig. 22. As each article and hanger assembly is passed between the molding members 406—406, the latter are caused to be reciprocated toward one another into engagement with the plastic coating and abut the same when the rollers 408—408 are at the high points of the cam 306. Following passage of each cam member 306 therebetween, the rollers 408—408 and their respective lever control members 410 move inwardly causing the rods 404 and the molding members attached thereto to retract away from the coated article. When fully retracted the molding members assume the dotted position shown in Fig. 22 completely clearing the coated article and permitting the same to proceed to the chilling chamber without interference.

What I claim is:

1. Apparatus of the character described comprising a support adapted to engage over the top of a cup-shaped body, said support having a lower molding surface extending outwardly from the side of the body, said support also having an elongated downwardly extending forming member shaped to extend through and to close an opening in the bottom of the body, a container for liquid plastic material, means for dipping said support and body in liquid plastic material in said container to coat the forming member, at least a portion of the body, and to apply a coating to the molding surface of said support, said molding surface and forming member being separable from the plastic coating thereon.

2. Apparatus as defined in claim 1, comprising an ejector movably carried by said support and engageable by movement relative to said support to move the body with its coating away from said molding surface and forming member.

3. Apparatus of the character described comprising a support adapted to engage over the top of a cup-shaped body, said support having a lower molding surface extending outwardly from the side of the body, said support also having an elongated downwardly extending forming member shaped to extend through and to close an opening in the bottom of the body, a container for liquid plastic material, means for dipping said support with a body carried thereby in liquid plastic in said container to coat the forming member, at least a portion of the body and to apply a coating to the molding surface of said support, a second container for coolant, means for partly immersing said support and coated body in coolant in said second container, means for effecting relative downward movement of the body on the support while in the coolant to separate the plastic material from said molding surface and said forming member to facilitate cooling of said material.

4. Apparatus of the character described, comprising a support adapted to engage over the top of a cup-shaped body, said support having an elongated downwardly extending forming member shaped to extend through and to close an opening in the bottom of the body, a container for liquid plastic material, means for dipping said support with a body carried thereby in liquid plastic in said container to coat the forming member and at least a portion of the body, a second container for coolant, means for partly immersing said support and coated body in coolant in said second container, means for effecting limited relative downward movement of the body on the support while in the coolant to release the body from said support and to separate the plastic material from said forming member to facilitate cooling of said material, rails for supporting the coated body when released from said support, means for moving said support laterally of said second container, said support extending into said body to move said body along said rails, and means for lifting said support out of said second container to leave the body on said rails.

References Cited in the file of this patent

UNITED STATES PATENTS

| | | |
|---|---|---|
| 1,585,880 | Schnell | May 25, 1926 |
| 1,708,429 | Mueller | Apr. 9, 1929 |
| 2,302,053 | Price | Nov. 17, 1942 |
| 2,320,583 | Forro | June 1, 1943 |
| 2,338,827 | Teague et al. | Jan. 11, 1944 |
| 2,362,397 | Pearce | Nov. 7, 1944 |
| 2,396,946 | Grupe | Mar. 19, 1946 |
| 2,509,531 | Ruhland | May 30, 1950 |
| 2,550,232 | Donnell | Apr. 24, 1951 |

FOREIGN PATENTS

| | | |
|---|---|---|
| 574,309 | Great Britain | Dec. 31, 1945 |